UNITED STATES PATENT OFFICE.

GEORGE N. JEPPSON, OF WORCESTER, MASSACHUSETTS, ASSIGNOR TO NORTON COMPANY, OF WORCESTER, MASSACHUSETTS, A CORPORATION OF MASSACHUSETTS.

BONDED ARTICLE AND METHOD OF MAKING SAME.

954,809.

No Drawing.

Specification of Letters Patent.   Patented Apr. 12, 1910.

Application filed April 23, 1909.   Serial No. 491,691.

*To all whom it may concern:*

Be it known that I, GEORGE N. JEPPSON, a citizen of the United States, residing at Worcester, in the county of Worcester and State of Massachusetts, have invented certain new and useful Improvements in Bonded Articles and Method of Making the Same, of which the following is a specification.

This invention relates to the preparation of bonded articles from alumina or an aluminous material which has been brought to a state of fusion in an electric furnace.

It is well known that commercial forms of alumina, for instance bauxite, contain also oxids or oxidized compounds of metals which are more readily reducible than aluminum, for example iron, silicon and titanium. When bauxite or other commercial impure form of alumina is melted in the electric furnace between carbon electrodes, or when reducing conditions are secured by adding to the charge a small proportion of carbon, these oxidized compounds are in part at least reduced, and the reduced portions are found to be segregated in the furnace product partly in the form of lumps or nodules of varying size and partly as inclusions in or coatings on the alumina. Such reduced impurities have heretofore always been regarded as undesirable constituents of the mass in all of its applications.

I have discovered that under proper conditions these reduced impurities or products derived from them are capable of performing an important function as a bond for the particles of the refractory substance, usually in connection with a supplemental bond or bonding flux. Thus if the nodules or particles of ferrosilicon and other reduced impurities be removed, as by hand-picking followed by magnetic separation, there remains in the product a certain proportion of reduced materials which are non-magnetic or very slightly magnetic, or which are so confined in, or attached to, or disseminated through the aluminous material as to be incapable of separation by ordinary methods of magnetic separation. These materials, when subjected to a high temperature under oxidizing conditions, give rise to oxidized products which I have found to be highly effective bonding agents. Thus ferrosilicon may yield ferrous or ferric silicate or both, which are highly efficient bonding agents when properly disseminated through the mass, and the reduced impurities, carbids and the like, may in a similar manner give rise to oxidation products having bonding properties. Those portions of the oxidized impurities which have escaped reduction in the electric furnace and therefore exist as oxids or oxidized compounds in the product as removed from the furnace, appear to be quite incapable of bonding action, possibly by reason of their uniform distribution through the alumina or their chemical union therewith in the form of high melting-point compounds. On the other hand, those portions of the impurities which have undergone reduction, are segregated from the alumina and are capable as above stated of yielding by oxidation a highly efficient bond.

I have found that in certain cases it is quite possible to produce an efficient bond from the oxidation products of properly disseminated reduced impurities without recourse to other materials. To secure the highest bonding efficiency, however, it is essential that these oxidation products should be distributed with substantial uniformity over the surfaces of the grains or particles to be united, and in order to secure this distribution I have found it preferable to incorporate with the product containing reduced impurities a small proportion of another bonding agent or bonding flux, the function of which is to dissolve or flux and thereby disseminate the oxidation products of the reduced impurities throughout the mass to be bonded. This flux should also be capable of serving as a bond, supplementing the bonding action of the oxidation products; it may however be used in much smaller proportions than would be required if it alone were relied upon to effect the union of the particles.

As an example of the method of producing my novel product I will describe the production of refractory bricks of aluminous material suitable for furnace linings:

Commercial bauxite is calcined in a rotary kiln, and thereafter melted in an electric furnace between carbon electrodes, preferably with the addition to the charge of a small proportion, say five per cent., of carbon, the object of this addition being to secure the greatest practicable reduction of the compounds of iron, silicon and titanium usually present in the material. The molten mass is permitted to solidify, crushed, and the nodules and detached particles of ferro-silicon and other reduced impurities are removed as far as is practicable by hand-picking followed by magnetic separation. The material may then be subjected to an oxidizing roast for the purpose of converting the remaining reduced impurities into oxidized products, and is thereafter separated into the required number of grades or sizes, each of which may be further treated by magnetic separation to remove any detached particles of reduced bodies which may have been unaffected by the previous treatments. The resulting aluminous material is superficially coated with the oxidation products produced during the roasting operation, and if mixed with a small proportion of water, or appropriate solution, and formed into the desired articles and fired, will be found to possess a very considerable degree of strength. I prefer however to incorporate with the material a sufficient proportion of a flux for the oxidation products to secure their uniform distribution, and for this purpose a small proportion, say one per cent., of fire-clay or other high-melting point ceramic bond has been found satisfactory. The mass is then molded or formed into refractory bricks or other forms, which are fired in the usual way and are found to be strong and extremely refractory to heat.

The bonded articles produced in the manner described contain a smaller proportion of fusible bond than is necessary to secure the proper strength when a ceramic bond only is relied upon, and by reason of this small proportion of fusible constituents are far more resistant to heat. The process is therefore particularly applicable to the manufacture of bricks for furnace linings, and to other articles as crucibles, tubes or the like which are required to endure very high temperatures.

It is probable that the effectiveness of the bond derived from the oxidation of the reduced constituents remaining in the electric furnace product may be ascribed in part at least to the manner of their inclusion in or attachment to the constituent particles, as evidenced by the fact that they are not capable of being removed by the ordinary magnetic separation even when magnetic in character. The reduced impurities remaining after the magnetic separation are apparently interlocked with the particles of alumina, and after oxidation are in position to exert the most effective bonding action.

I may omit the above-described oxidizing roast preparatory to forming the articles, and instead may mold the bricks or the like directly from the crushed and suitably graded electric furnace product containing reduced impurities, preferably with the addition of a proper proportion of a bonding flux. The article is then fired in a kiln under oxidizing conditions, the time and temperature being sufficient to effect the oxidation of the reduced impurities and the production of a bond as above described.

I claim:

1. The herein-described method which consists in melting an aluminous material containing reducible oxids in an electric furnace under reducing conditions, crushing the product, and forming the particles into an article bonded by the re-oxidized impurities.

2. The herein-described method which consists in melting an aluminous material containing reducible oxids in an electric furnace under reducing conditions, crushing the product, incorporating with the same a bonding flux, and forming the particles into an article bonded by the re-oxidized impurities and flux.

3. The herein-described method which consists in melting an aluminous material containing reducible impurities in an electric furnace under reducing conditions, crushing the product, roasting the same, and forming the particles into an article bonded by the re-oxidized impurities.

4. The herein-described method which consists in melting an aluminous material containing reducible impurities in an electric furnace under reducing conditions, crushing the product, roasting the same, incorporating therewith a bonding flux, and forming the particles into an article bonded by the re-oxidized impurities and flux.

5. The herein-described method which consists in melting an aluminous material containing reducible impurities in an electric furnace under reducing conditions, crushing the product, separating any excess of reduced impurities therefrom, roasting the product, and forming the particles into an article bonded by the re-oxidized impurities.

6. The herein-described method which consists in melting an aluminous material containing reducible impurities in an electric furnace under reducing conditions, crushing the product, separating any excess of reduced impurities therefrom, roasting the product, incorporating therewith a bonding flux, and forming the particles into an article bonded by the re-oxidized impurities and flux.

7. As a new article of manufacture, a refractory article of impure aluminous material bonded by the oxidation products of its reduced impurities.

8. As a new article of manufacture, a refractory article of impure aluminous material bonded by the oxidation products of its reduced impurities in conjunction with a flux for said oxidation products.

In testimony whereof, I affix my signature in presence of two witnesses.

GEORGE N. JEPPSON.

Witnesses:
 ALDUS W. HIGGINS,
 HENRY DUCKWORTH.